(12) United States Patent
Satoh

(10) Patent No.: US 9,292,508 B2
(45) Date of Patent: Mar. 22, 2016

(54) SEARCH DEVICE, SEARCH METHOD AND RECORDING MEDIUM

(71) Applicant: CASIO COMPUTER CO., LTD., Shibuya-ku, Tokyo (JP)

(72) Inventor: Katsuhiko Satoh, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 121 days.

(21) Appl. No.: 14/137,319

(22) Filed: Dec. 20, 2013

(65) Prior Publication Data

US 2014/0214808 A1 Jul. 31, 2014

(30) Foreign Application Priority Data

Jan. 30, 2013 (JP) ................. 2013-016199

(51) Int. Cl.
G06F 17/00 (2006.01)
G06F 17/30 (2006.01)

(52) U.S. Cl.
CPC .... G06F 17/30011 (2013.01); G06F 17/30619 (2013.01)

(58) Field of Classification Search
CPC ............... G06F 17/30386; G06F 17/30412; G06F 17/30554; G06F 17/30705; G06F 17/276
See application file for complete search history.

(56) References Cited

U.S. PATENT DOCUMENTS

2012/0254164 A1* 10/2012 Ide ............................ 707/723

FOREIGN PATENT DOCUMENTS

JP 08-235212 A 9/1996
JP 2000067070 A 3/2000

OTHER PUBLICATIONS

Japanese Office Action (and English translation thereof) dated Dec. 1, 2015, issued in counterpart Japanese Application No. 2013-016199.
Kiyohiro Kobayashi (and six others), Method for searching similar character strings in a file relative to input character strings, The Transactions of the Institute of Electronics, Information and Communication Engineers, Japan, the Institute of Electronics, Information and Communication Engineers, Jan. 25, 1991, vol. J74-D-I, Issue 1, pp. 39-49.

* cited by examiner

Primary Examiner — Truong Vo
(74) Attorney, Agent, or Firm — Holtz, Holtz & Volek PC

(57) ABSTRACT

A search device comprises a memory device for storing document data containing search target character strings to which delimiting characters are appended at both ends; an acquirer for acquiring keywords; a generator for generating a search character string by appending delimiting characters to both ends of the keywords; a designator for designating appearance positions where those extracted partial strings from the search character string appear in the search target character string of the document data; a determiner for determining the frequency with which partial strings common to the partial strings of the search character string appear with a positional relationship similar to the search character string in the search target character string; an evaluator for evaluating the degree of similarity between the search target character string and the search character string; and an output device for outputting the search target character string.

21 Claims, 12 Drawing Sheets

FIG.5A

DICTIONARY DATA

| HEADLINE WORD 1 ||| } CE |
|---|---|---|---|
| EXPLANATORY TEXT 11 | EXAMPLE TEXT 11 | EXPLANATORY TEXT 12 | } CB |
| EXAMPLE TEXT 12 | EXPLANATORY TEXT 13 | EXAMPLE TEXT 13 | |
| HEADLINE WORD 2 ||| } CE |
| EXPLANATORY TEXT 21 | EXAMPLE TEXT 21 | EXPLANATORY TEXT 22 | } CB |
| EXAMPLE TEXT 22 | EXPLANATORY TEXT 23 | EXAMPLE TEXT 23 | |
| . | . | . | |
| . | . | . | |
| . | . | . | |

FIG.5B

REARRANGED CONTENT TEXT DATA

| ·HEADLINE WORD 1· ||| } CE |
|---|---|---|---|
| EXPLANATORY TEXT 11 | EXPLANATORY TEXT 12 | EXPLANATORY TEXT 13 | } CC |
| EXAMPLE TEXT 11 | EXAMPLE TEXT 12 | EXAMPLE TEXT 13 | } CX |
| ·HEADLINE WORD 2· ||| } CE |
| EXPLANATORY TEXT 21 | EXPLANATORY TEXT 22 | EXPLANATORY TEXT 23 | } CC |
| EXAMPLE TEXT 21 | EXAMPLE TEXT 22 | EXAMPLE TEXT 23 | } CX |
| . | . | . | |
| . | . | . | |
| . | . | . | |

FIG.6

AMBIGUOUS SEARCH RESULT DISPLAY SCREEN

SEARCH WORD salaed

TARGET DICTIONARIES

ENGLISH-JAPANESE 1, ENCYCLOPEDIA

MAYBE...?

| EVALUATION | CANDIDATE | DICTIONARY |
|---|---|---|
| HIGH | salad | (E-J 1) |
| HIGH | salad | (ENCYCLOPEDIA) |
| MEDIUM | sala | (E-J 1) |
| MEDIUM | alae | (E-J 1) |
| . | . | . |
| . | . | . |
| . | . | . |

FIG.7

DICTIONARY TABLE

| DICTIONARY NUMBER | DICTIONARY NAME | LEAD ADDRESS |
|---|---|---|
| 1 | ENGLISH-ENGLISH DICTIONARY | 0x8000 |
| 2 | ENGLISH-JAPANESE DICTIONARY 1 | 0x8800 |
| 3 | ENGLISH-JAPANESE DICTIONARY 2 | 0x9000 |
| 4 | ENCYCLOPEDIA | 0x9800 |
| ⋮ | ⋮ | ⋮ |

FIG.12

| | SEARCH PATTERN | | | | | | | |
|---|---|---|---|---|---|---|---|---|
| | ·s | s | a | l | a | e | d | d· |
| APPEARANCE POSITION (ABSOLUTE ADDRESS) | #x0A1 | #x0A7 | #x0CD | #x192 | #x0CD | #x134 | #x23D | #x092 |
| | #x238 | #x14D | #x0DD | #x1B8 | #x0DD | #x1E2 | #x24D | #x118 |
| | #x3CD | #x3CE | #x1CE | #x1C3 | #x1CE | #x2C3 | #x2AB | #x1DB |
| | ... | ... | ... | ... | ... | ... | ... | ... |

FIG.13A

| | SEARCH PATTERN | | | | | | | |
|---|---|---|---|---|---|---|---|---|
| | ·s | s | a | l | a | e | d | d· |
| APPEARANCE POSITION (RELATIVE ADDRESS FROM LEAD ADDRESS OF NOTEWORTHY HEADLINE WORD) | 0 | 1 | 2 | 3 | 2 | - | 5 | 5 |
| | - | - | 4 | - | 4 | - | - | - |
| | - | - | - | - | - | - | - | - |

FIG.13B

| | SEARCH PATTERN | | | | | | | |
|---|---|---|---|---|---|---|---|---|
| | ·s | s | a | l | a | e | d | d· |
| COMBINATION 1 | 0 | 1 | 2 | 3 | 2 | - | 5 | 5 |
| COMBINATION 2 | 0 | 1 | 2 | 3 | 4 | - | 5 | 5 |
| COMBINATION 3 | 0 | 1 | 4 | 3 | 2 | - | 5 | 5 |
| COMBINATION 4 | 0 | 1 | 4 | 3 | 4 | - | 5 | 5 |

SEARCH DEVICE, SEARCH METHOD AND RECORDING MEDIUM

CROSS-REFERENCE TO RELATED APPLICATION

This application claims the benefit of Japanese Patent Application No. 2013-016199, filed on 30 Jan. 2013, the entire disclosure of which is incorporated by reference herein.

FIELD

This application relates generally to a search device, search method and recording medium.

BACKGROUND

Search systems having an ambiguous search function that when searching a document produce as hits parts that do not perfectly match the search keyword are known. For example, Patent Literature 1 (Unexamined Japanese Patent Application Kokai Publication No. H8-235212) discloses technology for executing an ambiguous search using a search index that records the position of characters appearing in the text being searched. With the technology of Patent Literature 1, first the positions at which characters appearing in the search keyword appear in the text being searched are acquired. Then, the degree of similarity is added when these characters appear in character strings being searched due to errors within a prescribed range from appearance position in the keywords. Ambiguous searches are conducted based on this calculated degree of similarity.

With the art disclosed in Patent Literature 1, the same degree of similarity is calculated for search target character strings having the same number of characters appearing in the search target with errors within a prescribed range from positions where the keywords appear. Consequently, character strings of the search target that are extremely close to the search keywords and character strings in which characters included in the search keywords only appear here and there have the same degree of similarity. Consequently, the problem exists that the search results have low accuracy in terms of finding documents that the user desires.

In consideration of the foregoing, it is an objective of the present invention to provide a search device, search method and recording medium capable of executing ambiguous searches with high accuracy.

SUMMARY

The search device according to the present invention comprises:

a memory device for storing document data containing search target character strings to which delimiting characters are appended at both ends;

an acquirer for acquiring keywords;

a generator for generating a search character string by appending delimiting characters to both ends of the keywords acquired by the acquirer;

a designator for extracting multiple partial strings from the search character string generated by the generator and designating appearance positions where those extracted partial strings appear in the search target character string of the document data;

a determiner for determining the frequency with which partial strings common to the partial strings of the search character string appear with a positional relationship similar to the search character string in the search target character string, based on the designation results of the designator;

an evaluator for evaluating the degree of similarity between the search target character string and the search character string based on the determination results of the determiner and the difference in character lengths of the search target character string and the search character string; and, an output device for outputting the search target character string based on the evaluation results of the evaluator.

Effects

With the present invention, ambiguous searches can be executed with high accuracy.

BRIEF DESCRIPTION OF THE DRAWINGS

A more complete understanding of this application can be obtained when the following detailed description is considered in conjunction with the following drawings, in which:

FIG. 5A is a drawing showing an example of dictionary data stored by the text search device;

FIG. 5B is a drawing showing an example of rearranged content text data stored by the text search device;

FIG. 6 is a drawing showing an example of a results display screen for text searches displayed by the text search device according to the first preferred embodiment;

FIG. 7 is a drawing showing an example of a dictionary table stored by the text search device according to the first preferred embodiment;

FIG. 12 is a drawing showing an example of position search results according to the first preferred embodiment;

FIG. 13A is a drawing showing an example of position information when an N-gram of a search pattern according to the first preferred embodiment appears in a noteworthy character string;

FIG. 13B is a drawing showing an example of a combination of position information items;

DETAILED DESCRIPTION

Figure 1:
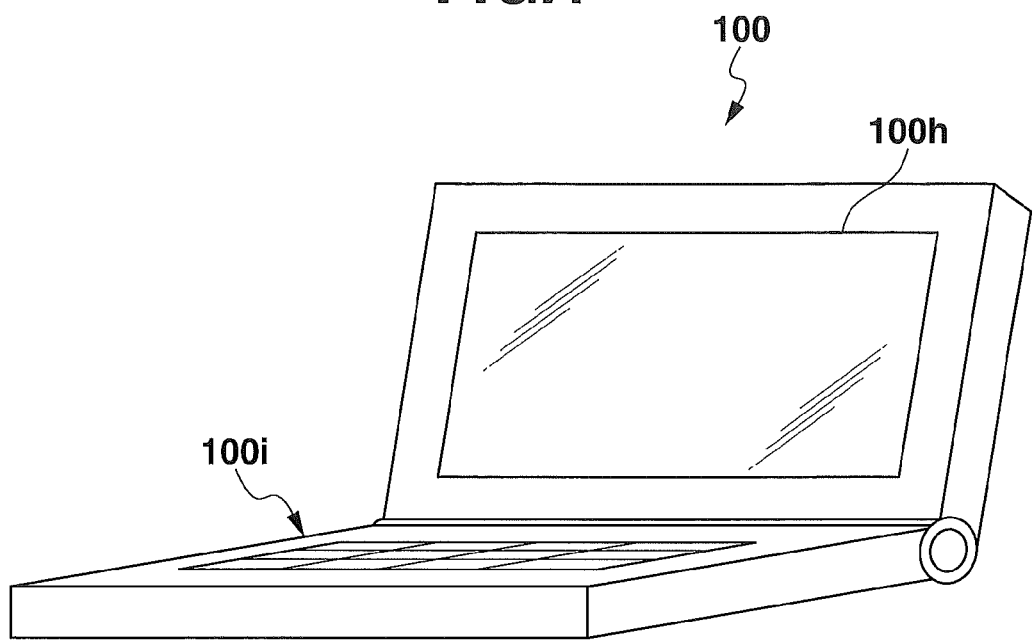
FIG. 1 is an oblique view showing one example of a text search device according to a first preferred embodiment of the present invention.

A text search device 100 according to a preferred embodiment of the present invention is described below with reference to the attached drawings;

The text search device 100 according to the preferred embodiment of the present invention constitutes an electronic dictionary such as the one shown in FIG. 1, and comprises a keyboard 100i for inputting search keywords in accordance with user operation and an LCD (Liquid Crystal Display) 100h for showing search results when the dictionary is searched based on the search keywords.

Figure 2:
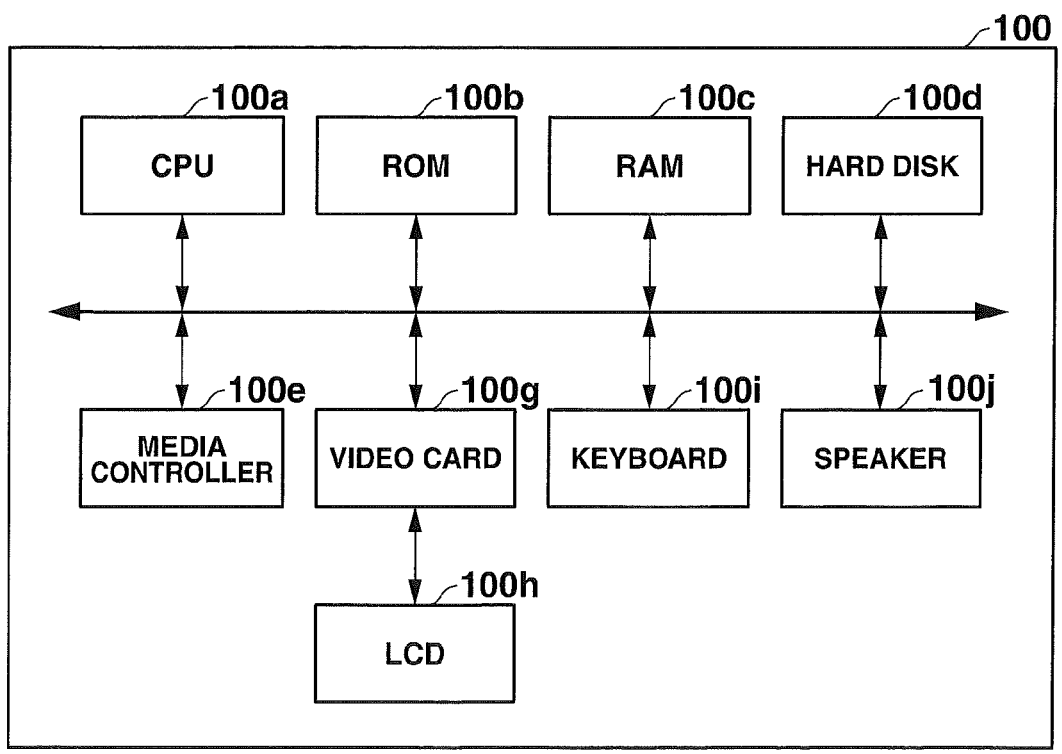
FIG. 2 is a drawing showing an example of the composition of the text search device according to the first preferred embodiment.

As shown in FIG. 2, inside the text search device 100 are a CPU (Central Processing Unit) 100a, ROM (Read Only Memory) 100b, RAM (Random Access Memory) 100c, hard disk 100d, media controller 100e, video card 100g and speaker 100j, and these are connected to the LCD 100h and the keyboard 100i shown in FIG. 1 via a bus.

The CPU 100a controls each component of the text search device 100 for the below-described search process through programs stored in the ROM 100b or on the hard disk 100d, and executes internal processes. The RAM 100c is used as a work area such as temporarily storing data being processed during execution of programs by the CPU 100a.

The hard disk 100d stores tables storing various types of data, and dictionary data such as an English-Japanese dictionary and/or the like. The text search device 100 may comprise flash memory in place of the hard disk 100d.

The media controller 100e reads various types of data and programs from recording media including flash memory, CD (Compact Disc), DVD (Digital Versatile Disc) and Blu-ray Disc®.

The video card 100g depicts (in other words, renders) images based on digital signals output from the CPU 100a and also outputs image signals showing rendered images. The LCD 100h displays images in accordance with image signals output from the video card 100g. The text search device 100 may comprise a PDP (Plasma Display Panel) or an EL (Electroluminescence) display in place of the LCD 100h. The speaker 100j outputs audio based on signals output from the CPU 100a.

When the user inserts recording media on which dictionary data is recorded into the media controller shown in FIG. 2, the CPU 100a receives a signal of dictionary data from the media controller 100e. Upon acquiring the dictionary data from the media controller 100e, the CPU 100a stores the dictionary data on the hard disk 100d. Following this, the CPU 100a executes a data generation process such as the one shown in FIG. 3 for generating electronic files and data used in searching the dictionary expressed by the dictionary data based on search keywords. Through this, the CPU 100a, working together with the other constituent elements of the text search device 100, functions as a generator 120 such as that shown in FIG. 4. FIG. 4 is a function block diagram showing the functions executed by the CPU 100a. Furthermore, the CPU 100a, working together with the other constituent elements of the text search device 100, in particular the hard disk 100d, functions as an information memory 110.

The information memory 110 stores dictionary data that is the search target in this preferred embodiment. As shown in FIG. 5A, this dictionary data comprises text expressing headline words (hereafter called headline word text), text expressing an explanation of the headline word (hereafter called explanatory text), and for example text expressing examples (hereafter called example text) of headline words such as idiomatic phrases, compound words and/or the like (hereafter called idioms). The explanatory text and example text combined are called body text. In other words, text contained in the dictionary data can be divided into two categories (headline word category, body category) consisting of text indicating headline words (headline word text) and body for explaining the headline words (body text). Text belonging to the body category can be further divided into two categories (explanatory category, example category) consisting of explanations, and examples, of headline words.

In addition, of the dictionary data, the part accounted for by headline word text is called the headline word part CE and the part accounted for by body text is called the body part CB.

The explanatory text is surrounded by explanation tags expressing that the content expressed by this text is an explanation, and the example text is surrounded by example tags expressing that the content expressed by this text is an example.

The dictionary data is comprised of constituent units extended, with a single constituent unit composed of a combination of a headline word part CE and a body part CB. Each constituent unit has, for example when the dictionary data is an English-Japanese dictionary, the headline word text located in the headline word unit CE arranged in alphabetic order. In each constituent unit, a body part CB including body text for explaining a headline word is positioned immediately following the headline word part CE containing that headline word text.

In addition, in each headline word part CE, a headline word number identifying the headline word part CE is assigned in advance. In the dictionary data, information associating (i) information expressing that headline word number, (ii) information expressing a lead address of a memory region in the information memory 110 where the headline word part CE identified by that headline word number is stored, and (iii) information expressing a lead address of the body part CB stored immediately after that headline word part CE, are included in the same number as the headline words. This constituent unit is also called one unit of a "document (character string) that is a search target." In this case, the dictionary data can be expressed as data in which multiple documents that are search targets are bundled together.

In the body part CB, multiple explanatory texts are arranged in an order determined by the editor of the electronic dictionary. As a concrete example, explanatory text explaining more general meaning content of the headline word is stored at a position in advance of explanatory text explaining more specific meaning content of the headline word. Or, it would be fine for explanatory text explaining meaning content with a higher usage frequency to be stored at a position in advance of explanatory text explaining meaning content with lower usage frequency.

When a user inputs a search keyword using the keyboard 100i and executes a decision operation, the text search device 100 of this preferred embodiment displays headline words in which an evaluation value computed based on similarity to the search keyword is larger than a prescribed threshold value, out of the above-described headline words, in descending order of evaluation value (FIG. 6). The method of computing the evaluation value is described below.

In this preferred embodiment, headline words contained in search target dictionaries specified by the user (in the example in FIG. 6, an English-Japanese dictionary 1 and an encyclopedia), out of the dictionaries stored in the text search device 100 (see FIG. 7), become the target documents of ambiguous searches.

Here, a data generation process for generating a search index (transposition index) used in the search process of this preferred embodiment is explained with reference to FIG. 3. The generator 120 starts the data generation process shown in FIG. 3 upon acquiring dictionary data.

In the data generation process, first the generator 120 reads dictionary data expressing dictionary content stored in the information memory 110 (step S1).

Then headline word text and body text (explanatory text and example text) are extracted from the dictionary data that was read (step S2). This will be explained concretely. Because explanatory text and example text are intermixed in the body part CB, the generator 120 divides this text into classifications in accordance with content. Consequently, the generator 120 extracts multiple headline word texts and body texts from the dictionary data using information expressing headline word numbers contained in the dictionary data and information expressing the lead address of the headline word part CE.

Furthermore, for each headline word text extracted in step S2, the generator 120 extracts multiple explanatory texts explaining the headline words expressed by the headline word text, based on explanatory tags from the body text, and also extracts multiple example texts expressing examples of the headline words from the body text based on the example tags.

Then, a mark (delimiting character, here a half-width space) indicating an end is inserted at the head and end of the text (here, headline words) of the category that is the subject of ambiguity. When the headline word is in English, a half-width space is not inserted in places where words are delimited by half-width spaces, and half-width spaces are only inserted in places where there is no leading half-width space, or where there is no half-width space before and after the word, such as when there is a period ".", a comma ",", an exclamation mark "!", a question mark "?" and/or the like at the end of a word. As a result, a character string is reproduced in which a delimiting character (half-width space) is inserted into multiple items of text (here, multiple headline words) that are search subjects. This character string including delimiting marks is also called a target character string because this becomes the target of an ambiguous search process in the below-described processes.

Following this, the generator 120 generates and stores rearranged content text data (CTD) such as that shown in FIG. 5B (step S4). Specifically, after extracting the delimiting character (here shown in the drawing substituted with "•") in the headline word text, the generator 120 generates the position (hereafter called the explanatory part CC) where the extracted multiple explanatory text items are arranged, by arranging such without altering the arrangement sequence of extracted explanatory text items, for each constituent unit.

Similarly, the generator 120 generates the position (hereafter called the example part CX) where the extracted multiple example text items are arranged, by arranging such without altering the arrangement sequence of the extracted multiple example text items, for each constituent unit.

Here, the explanation is for an example in which a delimiting character is inserted at both ends of the headline word CE (for example, before the "s" and after the "d" in the headline word "salad"). The insertion location of the delimiting characters is not limited to this and can be arbitrarily set. For example, when the explanatory text and example text are targets of an ambiguous search, it would be fine to insert delimiting characters at both ends of each word appearing in the explanatory part CC and the example part CX. Or, it would be fine to insert delimiting characters before and after critical phrases out of the phrases appearing in the explanatory part CC and the example part CX.

The generator 120 generates multiple data items (rearranged content text data, or rearranged CTD) associated with the headline word part CE, the explanatory part CC and the example part CX. Then, the generator 120 stores the generated rearranged content text data in the information memory 110 (step S4).

Following this, the generator 120 generates dictionary numbers identifying dictionaries expressed by the rearranged content text data. Next, the generator 120 stores information associating information expressing the generated dictionary number, information expressing the title of the dictionary and information expressing the lead address of the memory region of the information memory 110 in which the rearranged content text data is stored, in the information memory 110 in the dictionary table shown in FIG. 7 (step S5).

Following this, the generator 120 extracts a monogram character string pattern by cutting off one character while shifting one character at a time from the head for each of the texts expressed by the rearranged content text data (that is to say, the text positioned in the headline word part CE, the explanatory part CC and the example part CX). In addition, similarly the generator 120 extracts a bigram character string pattern by cutting off two characters while shifting one character at a time from the head of the text expressed by the rearranged content text data. Below, the monogram character string pattern and the bigram character string pattern are generically called N-gram character string patterns. In this preferred embodiment, characters are assumed to be contained in character strings and with the exception of the case where there is a notation to specially differentiate, no differentiation is made between characters and character strings.

Next, the generator 120 specifies one or multiple positions (hereafter, appearance positions) at which the N-gram character string pattern appears in text (hereafter called rearranged text) expressed by the rearranged content text data. Following this, the generator 120 computes the appearance frequency for the N-gram character string pattern in the rearranged text, for each N-gram character string pattern. The appearance frequency will be explained for example as the total number of times the N-gram character string pattern occurs in the rearranged text, but this intended to be illustrative and not limiting.

Next, the generator 120 generates appearance position information associating one or multiple information items expressing an address (hereafter called an appearance position address) indicating the appearance position at which the N-gram character string pattern appears, and information expressing the appearance frequency of that N-gram character string pattern, for each N-gram character string pattern.

Figure 3:
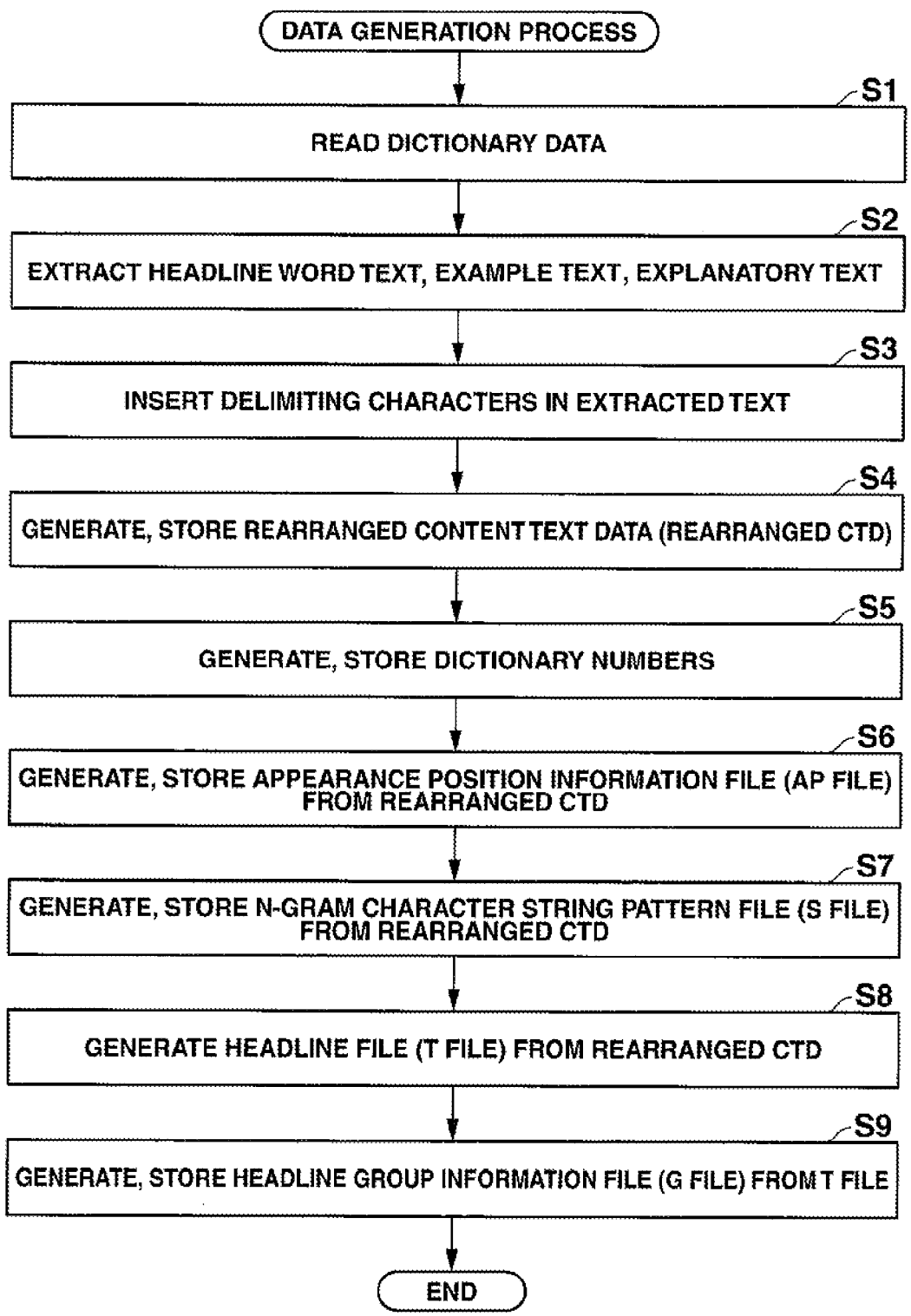
FIG. 3 is a flowchart showing an example of a data generation process executed by the text search device according to the first preferred embodiment.
Figure 4:
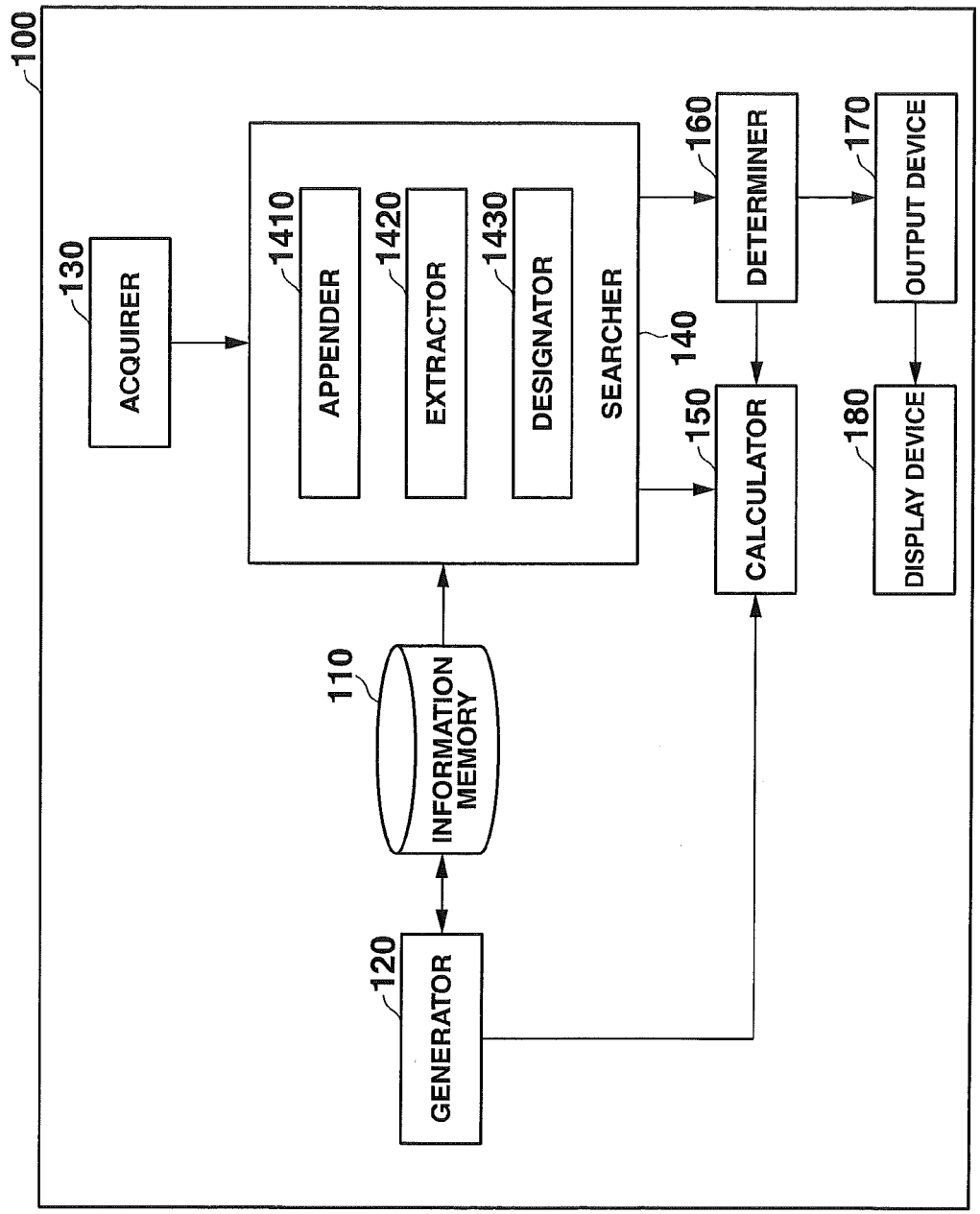
FIG. 4 is a block diagram showing an example of the function composition of the text search device according to the first preferred embodiment.

Next, the generator 120 generates an electronic file including one or multiple appearance position information items (hereafter called an appearance position information file or AP file), and stores the file in the information memory 110 (step S6 in FIG. 3).

Figure 8:
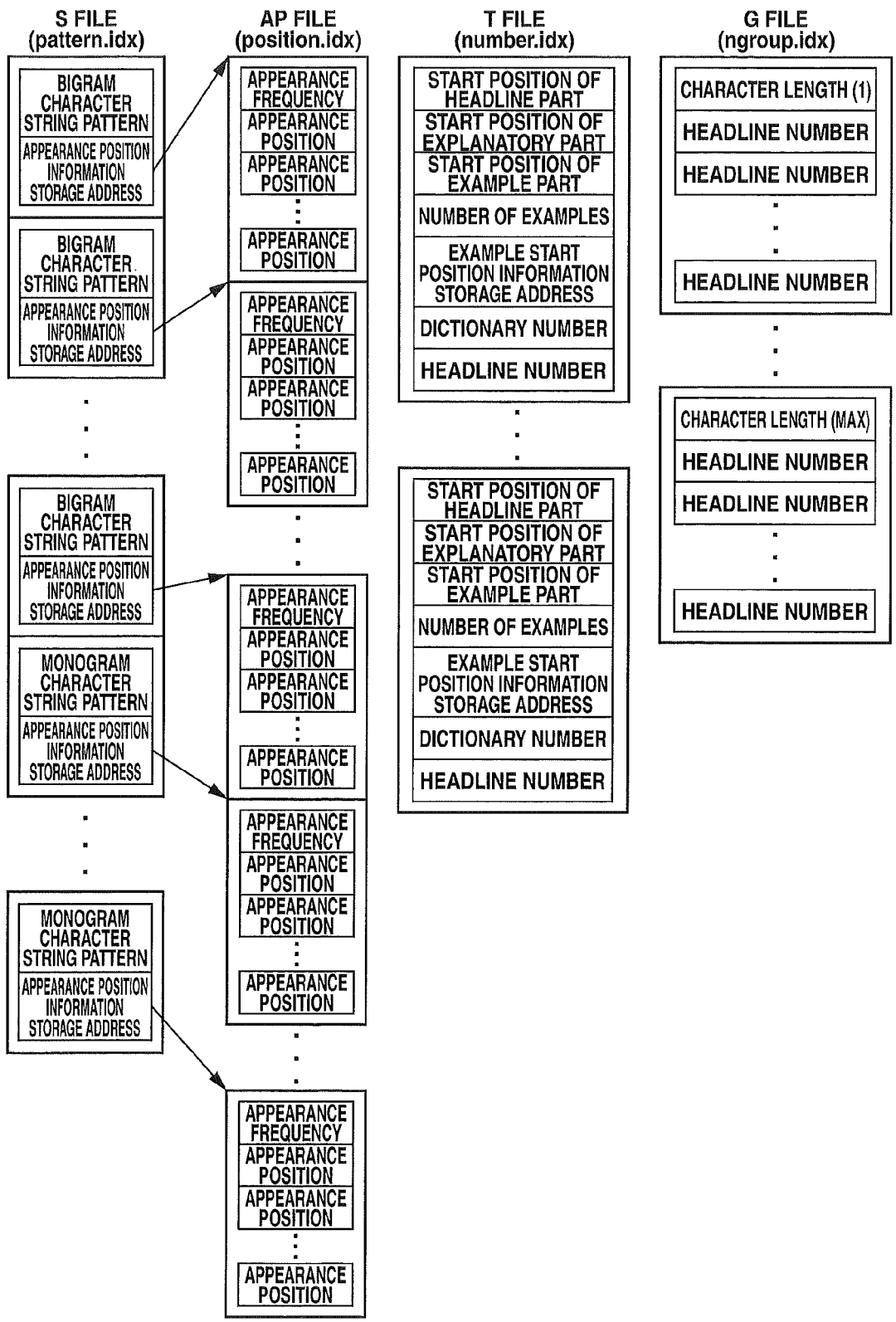
FIG. 8 is a drawing showing an example of an electronic file containing a transposition index stored by the text search device according to the first preferred embodiment.

In FIG. 8, the appearance position information file (AP file) is indicated by the title (file name) "position.idx". In addition, the appearance position information stored in the appearance position information file stores information expressing the appearance frequency in a region from the lead address to a prescribed byte number for the appearance frequency, and information expressing the appearance position address for each prescribed byte number for appearance positions from immediately after that region. The information expressing the appearance position address may be information about the address corresponding to the position where the target N-gram appears in the dictionary data, in the hard disk 100$d$ where the dictionary data is recorded, for example.

Next, the generator 120 generates an electronic file (hereafter called the N-gram character string pattern file or the S file) including multiple piece of information associating information expressing an N-gram (hereafter called N-gram character string pattern information) and information expressing the lead address (hereafter called the appearance position information storage address) of the memory region in the information memory 110 where the appearance position information of that N-gram character string pattern is stored. Following this, the generator 120 stores the S file in the information memory 110 (step S7).

In FIG. 8, the S file is indicated by the title (file name) "pattern.idx".

Next, the generator 120 generates an electronic file (hereafter called the headline word file or the T file) containing multiple pieces of information associating (i) the headline number identifying the headline part CE containing the headline word text, (ii) information expressing the lead address (hereafter called the address expressing the start position of the headline part CE) of the memory region in the information memory 110 where that headline part CE is stored, (iii) information expressing the lead address (hereafter called the address expressing the start position of the explanatory part CC) of the explanatory part CC where explanatory text explaining the headline word expressed by that headline word text is positioned, (iv) information expressing the lead address (hereafter called the address expressing the start position of the example part CX) of the example part CX where example text expressing examples of that headline word is positioned, (v) information expressing the address (hereafter called the example start position information storage address) expressing the lead position of the region where the example part start position information of that example part CX is stored in the information memory 110, and (vi) information expressing the dictionary number of the dictionary where that headline word is noted. Here, the range from the start position of the headline part to immediately before the start position of the explanatory part is the range where the headline word corresponding to the headline number is stored. In addition, the range from the start position of the example part to immediately before the start position of the next headline part is the range where the example part corresponding to the headline number is stored. When multiple examples are contained in the example part, the range of each example is determined by the example start address stored at the example start information storage address. Information corresponding to one headline word from the start position of the headline up to the headline number in FIG. 8 (headline word information) has a fixed length (for example, 1K bytes). In FIG. 8, the T file is indicated by the title (file name) "number.idx".

Next, the generator 120 generates headline group information (G file) indicating information of the group compiling headline words of the same character length, out of the headline words contained in the rearranged CTD (step S9). The G file associates and stores the character count (n characters) of that group and information corresponding to the position of headline words of n characters (n=1 to MAX). When creating the G file, the generator 120 first generates a MAX number of groups corresponding to a character count of 1 to MAX. The value of MAX is the maximum length of headline words contained in the rearranged CTD, is measured in advance and is stored in the memory 110. Furthermore, the generator 120 extracts the character count of the headline word corresponding to the region from the start position of the headline part to immediately before the start position of the explanatory part, and the headline number of that headline word, while referencing one at a time headline part information items defined by the T file. Then, the extracted headline number is recorded in the group of extracted character counts. The generator 120 executes this process based on all headline parts defined by the T file and generates the G file. The generator 120 stores the generated G file in the information memory 110 (step S9 shown in FIG. 3) and then concludes execution of the data generation process. In FIG. 8, the T file is indicated by the title (file name) "ngroup.idx". Because the headline word information is information of a fixed length, if the head of the T file, which is a known value, is referenced, the lead address of the associated headline word information can be obtained from the headline word number. As information associated with the position of the headline word, the lead address of the associated headline world information may be stored in the G file.

As shown in FIG. 8 (particularly "pattern.idx" and "position.idx"), an index structure in which the character string (here, an N-gram) and the appearance position of the character string in the document that is the search target are associated and recorded is called the transposition index. In this preferred embodiment, through the data generation process a transposition index for the rearranged CTD to which is attached the delimiting characters (half-width spaces) indicating breaks at breaks in the document (before and after the headline) is generated for the text of a prescribed category (here, a headline word).

When the transposition index is stored in the information memory 110, preparations for executing a search process are made using this transposition index. In this state, when the user executes an operation of inputting a search keyword used in searching a dictionary using the keyboard 100$i$, the CPU 100$a$ receives that information and executes the text search process shown in FIG. 9.

By executing this text search process, the CPU 100$a$ functions as an acquirer 130; a searcher 140 including an appender 1410, an extractor 1420 and a designator 1430; a calculator 150; a determiner 160; and an output device 170, as shown in FIG. 4. In addition, the CPU 100$a$ works with the video card 100$g$ and the LCD 100$h$ shown in FIG. 2 to function as a display device 180.

Figure 9:
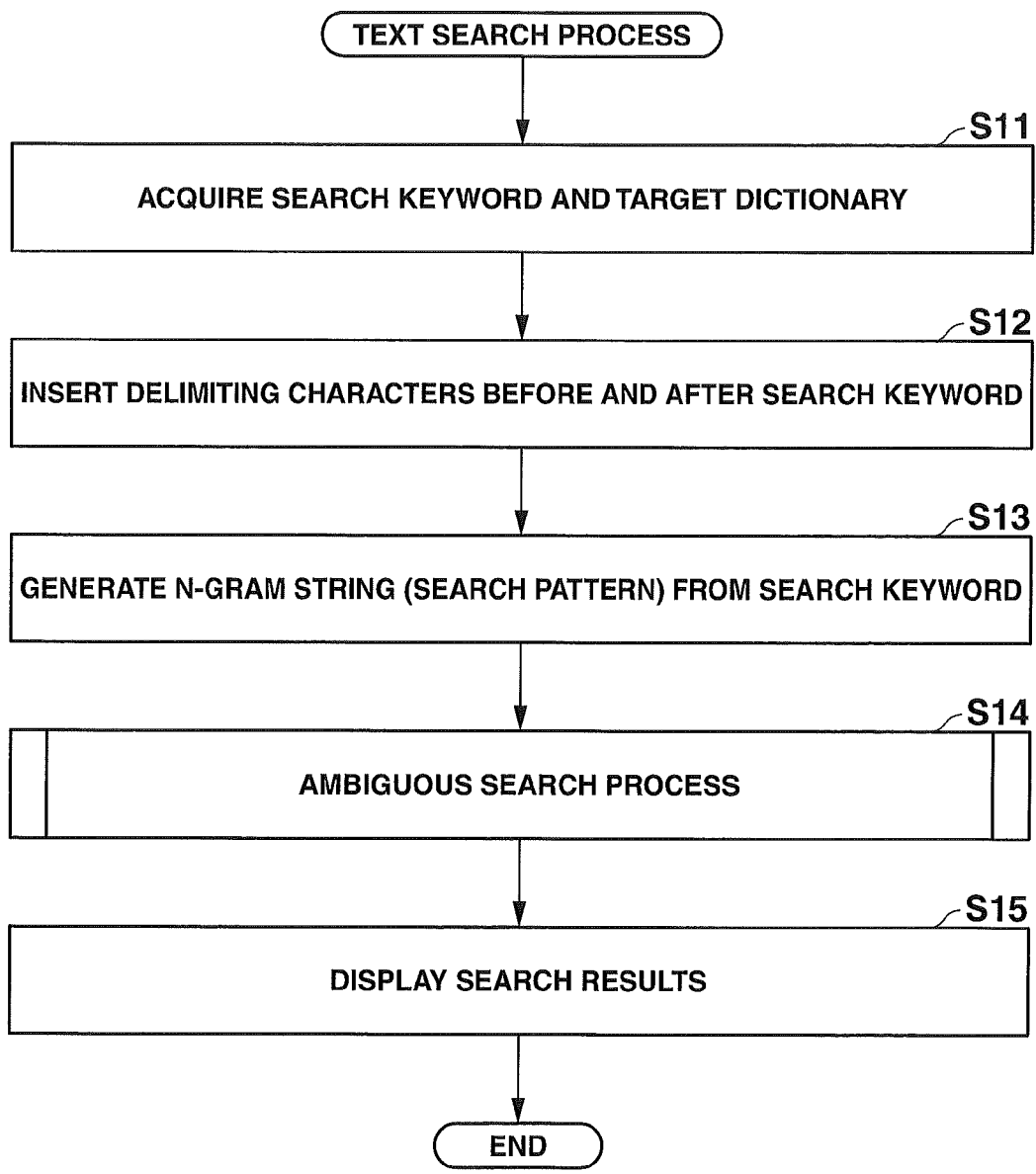
FIG. 9 is a flowchart showing an example of a text search process executed by the text search device according to the first preferred embodiment.

When the user inputs a search keyword specifying a target dictionary using the keyboard 100$i$, the CPU 100$a$ starts the text search process shown in FIG. 9. In the text search process, first the acquirer 130 acquires the keywords input up to the present (the search keywords) and information specifying the dictionary that is the target of searching (step S11). When the decided search keywords contain delimiting characters (spaces and/or the like), the input characters are delimited by those delimiting characters and multiple search keywords are acquired.

Then, the appender 1410 inserts the delimiting characters (half-width spaces) in front and back of a search keyword, making this a search character string (step S12). When there are multiple search keywords, the delimiting characters are inserted for each search keyword.

Figure 10:
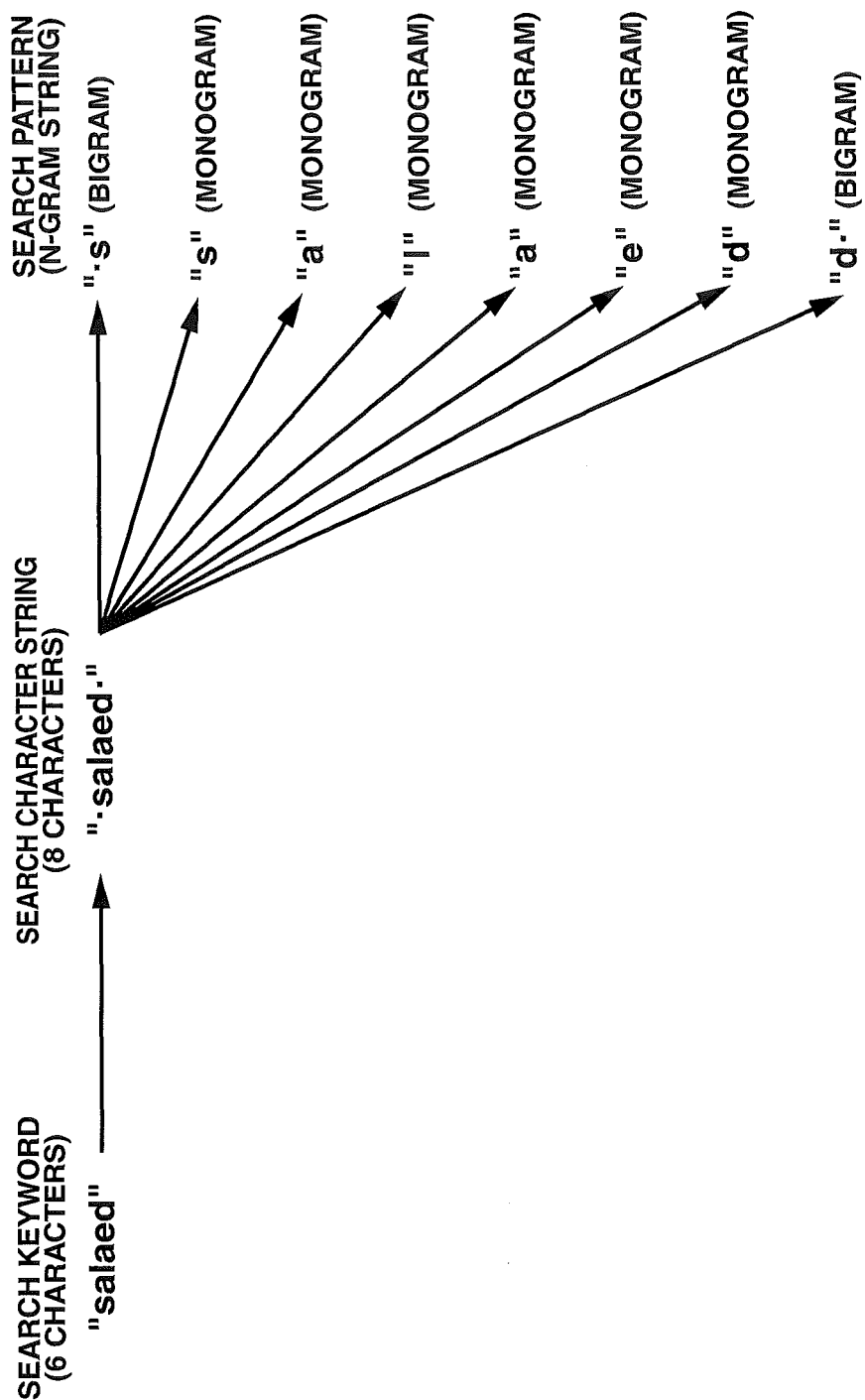
FIG. 10 is a drawing showing a summary of an N-gram extraction process executed by the text search device according to the first preferred embodiment.

Furthermore, the extractor 1420 extracts a string of N-grams (search pattern) from the search character string in which the delimiting characters were inserted (step S13). An example of the extraction process executed in step S13 is shown in FIG. 10. In the explanation below, a case where the user mistakenly input "salaed" instead of the English word "salad" is taken as an example. In this case, the bigrams "•s" and "d•" (where "•" indicates a half-width space) containing the delimiting character, and the monograms "s", "a", "l", "a", "e" and "d" are extracted as N-grams. These eight N-grams become the N-gram character string pattern (search pattern). Of these, the monogram "e" is an improper monogram generated by a typo (improper ratio 1/8). Thus by making the lead and tail N-grams have a character count of bigrams or greater, it is possible to prevent the positional relationship between the delimiter and part of the search keyword out of the search character string (here, s and d) from being lost. In addition, all characters contained in the search character string are contained in one of the N-grams, so it is possible to reflect the total length of the search character string as a whole when finding the degree of similarity between the search character string and the target character string.

In addition, for parts not contained in the delimited characters (the keyword part), by extracting monograms, when a single-character mistake is made, mistakes in the N-grams before and after and excessive dropping of the below-described degree of similarity are prevented. For example, when all characters are extracted as bigrams, in the above example the bigrams "•s", "sa", "al", "le", "ea", "ad" and "d•" are extracted from the keyword part. In this case, a one-character typo generates two inappropriate bigrams ("le" and "ea") (an improper ratio of 2/7), so the degree of similarity drops greatly. In this preferred embodiment, the effects of the typo are kept from becoming excessively large by extracting monograms from the part not containing delimiting characters (the search keyword part), out of the search character string generated in step S12.

Next, the searcher 140 executes a process (the ambiguous search process) that ambiguously searches multiple documents (in this preferred embodiment, headline word text contained in the rearranged CTD) contained in the dictionary data that is the search target using a search keyword with delimiting characters appended (step S14).

Figure 11:
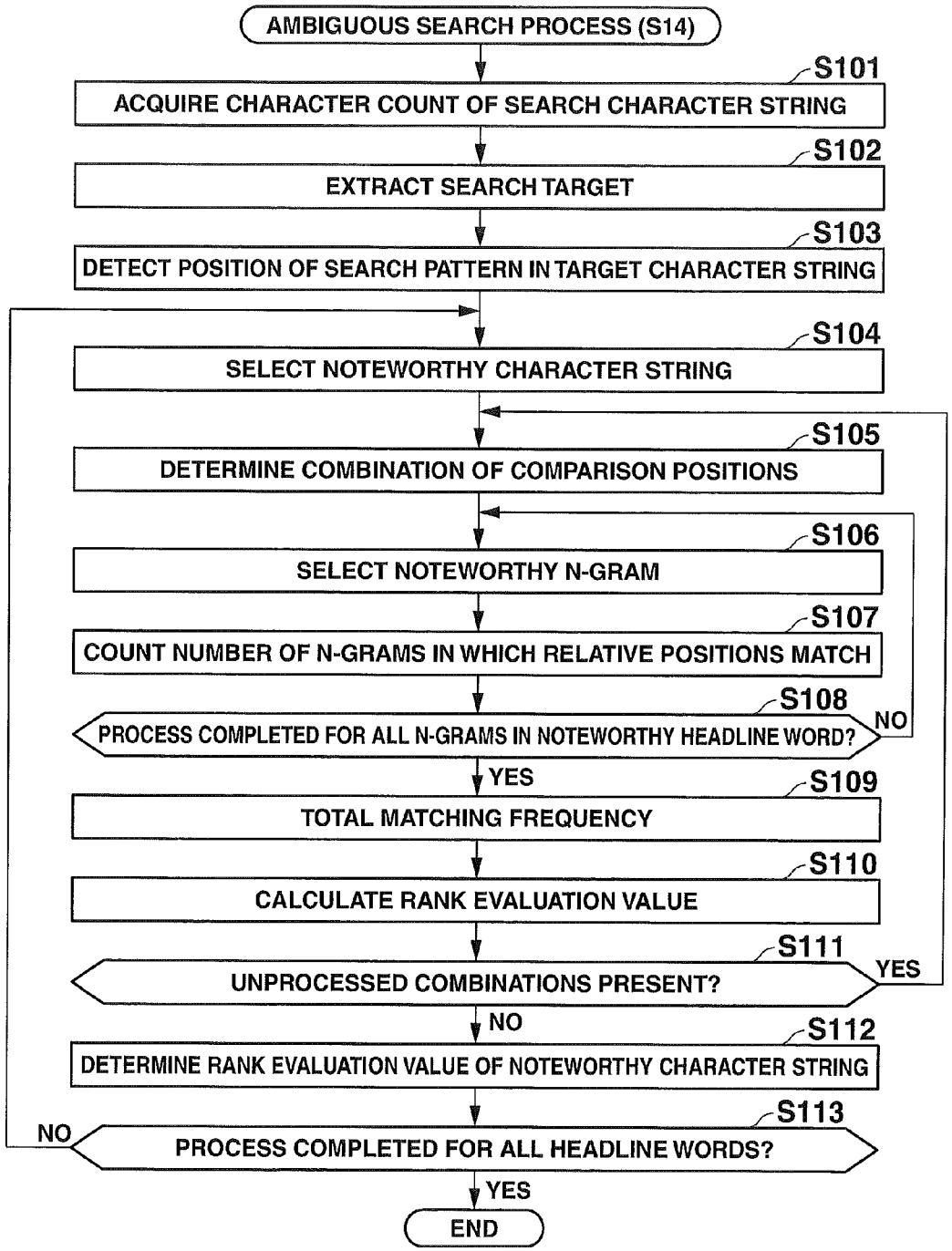
FIG. 11 is a flowchart showing an example of an ambiguous search process executed by the text search device according to the first preferred embodiment.

The ambiguous search process executed in step S14 is explained with reference to FIG. 11.

In the ambiguous search process, the searcher 140 acquires the character count of the search character string (step S101). For example, when the search character string is "•salaed•", a character count (character string length) of 8 is acquired.

Next, the searcher 140 extracts the character string that is the search target (target character string) with reference to the G file (step S102). Specifically, the searcher 140 first computes the numerical value within the range of the predetermined error value from the character count acquired in step S101. For example, when the character count is 8 in step S101 and the error value is set at 4, the numerical value of the error value within the range becomes 4-12. The error value may be a numerical value set at the time of shipment from the factory or a numerical value set by a setting operation by the user. In this preferred embodiment, the headline word within this range becomes the target character string. Next, the searcher 140 extracts from the G file group a group whose character length is within the range of the error value. Furthermore, the searcher 140 extracts the headline number recorded in the extracted group. The searcher 140 extracts the memory region in which the target character string is stored, using the headline information indicated by the extracted headline number. Specifically, the region from the "headline part start position" of the headline information with the extracted headline number to immediately before the "explanatory part start position" is extracted as an appearance region in which the target character string exists. When a dictionary that is the search target has been set, headline parts other than the set dictionary number are not targets of the above-described process.

Next, the designator 1430 designates the position of the N-grams contained in the search character string generated in step S13 of FIG. 9 (step S103). For example, the designator 1430 acquires the N-gram character string pattern information agreeing with the N-grams of the N-gram string (search pattern) generated in step S13 of the text search process, from the S file in FIG. 8. Then, the appearance position information storage address associated with the N-gram character string pattern information acquired from the S file is acquired. Then, the AP file recorded at the acquired address in the information memory 110 is read, and position information on where the N-grams contained in the search character string appear is acquired. As a result, for example as shown in FIG. 12, information associating each N-gram generated in step S13 and the appearance position of N-grams recorded in the AP file for that N-gram (the address of the position where such appears in the dictionary data) is obtained.

The designator 1430 in step S103 further extracts the address contained in the range of the search target (the region extracted in step S102), from the addresses recorded in the table in FIG. 12. The address (position information) obtained as a result becomes the appearance position where the N-gram contained in the search character string appears in the target document (headline word). The N-gram appearing at each appearance position is also called the common character string due to being a partial string appearing in both the search character string and the target character string. In order to reduce processing volume, search targets extracted in step S102 but containing not even one N-gram contained in the search character string may be excluded from the search targets in this step.

Next, the searcher 140 selects a character string (noteworthy character string) that is the current process target, from the target character string extracted in step S102 (step S104). Specifically, from the target character string extracted in step S102, the one having the lowest headline number on which the below-described processes have not yet been executed is selected as the noteworthy character string.

Then, the calculator 150 calculates a ranked evaluation value as an evaluation of the degree of similarity between the noteworthy character string and the search character string, using the determiner 160 (steps S105-S112). Specifically, first the calculator 150 determines combinations of appearance positions that are relative targets (step S105). Combinations of appearance positions are explained with reference to FIG. 13. For example, when the search patterns ("•s", "s", "a", "l", "a", "e", "d" and "d•") of the search character string "•salaed•" and the noteworthy character string "•salad•" are compared, the N-grams of the search pattern appear at the positions shows in FIG. 13A in the noteworthy character string. Here, "•s", "s", "l", "d" and "d•" each appear in one location. On the other hand, "a" appears at the two locations of the second character and the fourth character from the start of the noteworthy character string, and "e" is not included in the noteworthy character string and thus does not appear in even one position. In order to find the tables in FIG. 13, for example only the position information contained in the range of the noteworthy character string is extracted from the table at the appearance position in the target character string of the search pattern detected in step S103. Furthermore, the start position of the noteworthy character string may be subtracted from the extracted position information.

When N-grams existing at multiple appearance positions in the search pattern are included like "a" of FIG. 13A, multiple combinations with appearance positions for each N-gram selected one at a time are extracted as in FIG. 13B. In step S105, the calculator 150 selects these combinations in sequence as targets of the comparison process of the search character string and the noteworthy character string in this loop.

Next, in the combinations of the noteworthy character string the determiner 160 determined in step S105, the frequency with which the N-grams contained in the noteworthy character string appear with a positional relationship similar to the search character string is determined (steps S106 to S109).

First, the determiner selects a noteworthy N-gram to be a process target, from the N-grams appearing in the noteworthy character string (step S106). Here, suppose that the N-gram appearing at the top-most address that has not been selected yet as the noteworthy position is selected, from among the appearance positions of the noteworthy character string.

Next, the determiner 160 counts the N-grams whose relative positions match (or are similar) in the N-gram string (noteworthy pattern) obtained from the noteworthy character string and the N-gram string (search pattern) obtained from the search character string, with the positions at which the noteworthy N-grams appear as a reference (step S107). The relative positions of the N-grams with the noteworthy positions as a reference are values found by subtracting the lead address of the target N-gram from the address of the noteworthy position. The counted results can be thought of as the degree of matching of the noteworthy pattern and the search pattern, with the N-grams (noteworthy N-grams) appearing at the noteworthy positions as references.

Figure 14A:
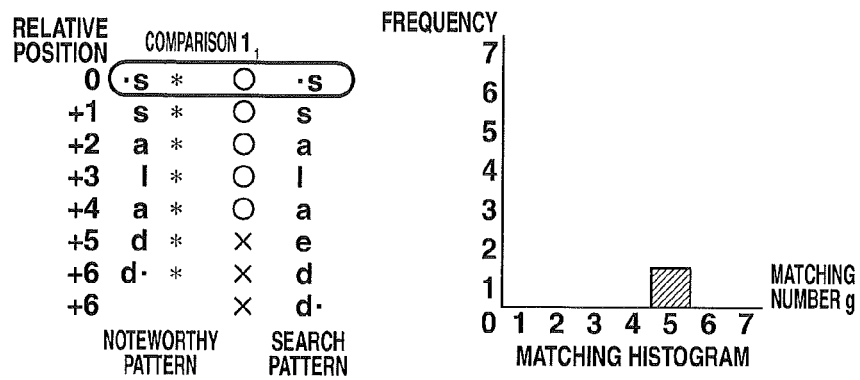
FIG. 14A is a drawing for explaining a summary of a process (when processing the first of all appearance positions) for finding the degree of matching between the search character string and the noteworthy character string executed by the text search device according to the first preferred embodiment.
Figure 14B:
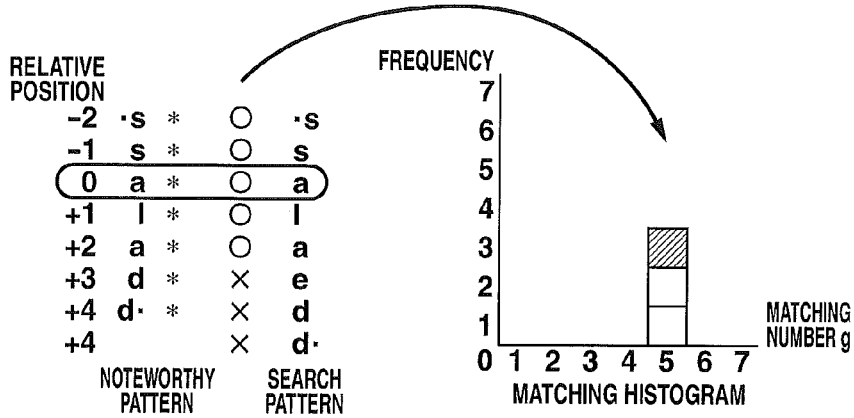
FIG. 14B is a drawing for explaining a summary of a process (when processing the middle of all appearance positions) for finding the degree of matching between the search character string and the noteworthy character string executed by the text search device according to the first preferred embodiment.
Figure 14C:
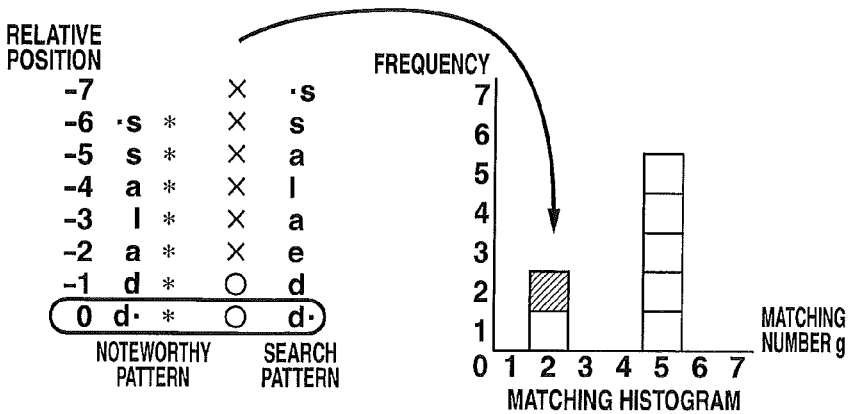
FIG. 14C is a drawing for explaining a summary of a process (when processing the last of all appearance positions) for finding the degree of matching between the search character string and the noteworthy character string executed by the text search device according to the first preferred embodiment.

The process of step S107 is explained with reference to FIGS. 14A to 14C, taking as an example the case in which the search character string is "•salaed•" and the noteworthy character string is "•salad•", and the combination determined in step S105 is "combination 2". To facilitate understanding here, the case in which the detection pattern and the noteworthy pattern (the N-gram string when N-grams are extracted from the noteworthy character string under the same rules as the extractor 1420) are lined up and compared is explained.

When the search character string is "•salaed•" and the noteworthy character string (headline word that is the comparison subject) is "•salad•", the search pattern is the N-gram string in which the bigram "•s", the monograms "s", "a", "l", "a", "e" and "d" and the bigram "d•" are lined up. On the other hand, the noteworthy pattern is the N-gram string in which the bigram "•s", the monograms "s", "a", "l", "a" and "d" and the bigram "d•" are lined up. The asterisks in FIGS. 14A to 14C are the N-grams that appear at the appearance positions (the locations where N-grams contained in the search pattern appear).

In the ambiguous search process, the lead appearance position (the lead address of "•s") is selected as the first noteworthy position. In this case, the noteworthy N-gram appearing at the noteworthy appearance position is "•s". When the noteworthy pattern and the search pattern are lined up at the position where the noteworthy N-gram appears, the result is as shown on the left in FIG. 14A.

As a result, it can be understood that the five N-grams "•s", "s", "a", "l" and "a" overlap (positional relationship matches) in the noteworthy pattern and the search pattern. In FIGS. 14A to 14C, combinations of N-grams when the relative positions match are indicated by an O and combinations that do not match are marked with an X. Hence, one is added to the g=5 matching number of the histogram of degree of matching (FIG. 14A). This count result "5" indicates the number of common N-grams whose positional relationships match the reference N-gram, with the N-gram "s" appearing in both the noteworthy pattern and the search pattern as the reference.

When the number of common N-grams whose relative positions match is counted in step S107, next a determination is made as to whether or not the count process has completed for all appearance positions (step S108). When there is an unprocessed appearance position (step S108: No), the process returns to step S106 and a noteworthy N-gram is selected with the next appearance position as the noteworthy position.

Next, the number of common N-grams for which the positional relationship matches is counted with the N-gram appearing at the noteworthy position (common part string) as a reference and each appearance position as the noteworthy position. When a noteworthy N-gram appears two or more times in the search pattern, a count is made for the appearance position of the currently selected combination ("combination 2" in this example) out of the multiple appearance positions (FIG. 14B).

When the count is made up to the last N-gram and the number of matches is recorded in the histogram (FIG. 14C), in step S108 it is determined that the process is completed for all appearance positions (step S108: Yes), and next the determiner 160 totals the count results and finds the similarity coefficient (FuzzyEst$_{idxid,hdlid}$) of the search character string and the noteworthy character string (step S109). In this preferred embodiment, the calculation is made using the following equation (1).

[Equation 1]

$$FuzzyEst_{idxid,hdlid} = \frac{\sum_{g=1}^{M}(g \times Freq_g)}{M \times M} \times FConst \qquad (1)$$

Here, idxid indicates the headline number and hdlid indicates that the search target is a headline word. Moreover, g is the horizontal axis (number of matches) of the histogram, Freq$_g$ is the vertical axis (frequency at which the count results of the match number g was obtained) of the histogram and M is the number of N-grams comprising the search character string. In the histogram in FIG. 14C, the element of equation (1) (value of Σ) becomes 2*2+5*5=29. This value is the frequency with which the relative positions of all common N-grams (common character strings) match (cumulative match frequency), in the noteworthy pattern and the search pattern. When all N-grams match, this cumulative match frequency is the square of M. In equation (1), the match frequency is normalized by dividing the cumulative match frequency by the square of M. FConst is a prescribed constant and in this example is taken to be 100. The similarity coefficient is not limited to Equation (1), and it would be fine to find the similarity coefficient for example with reference to a table in which are recorded the correlation between a suitable Freqg and FuzzyEstidxid, hdlid found in advance through experimentation. At this time, it is preferable for the frequency with which the N-grams of the search pattern continuously match to a value of g the N-grams of the search pattern in the noteworthy character string to be such that the larger the better for the value of g in a prescribed range.

When the degree of similarity (FuzzyEstidxid, hdlid) of the search character string and the noteworthy character string is found in step S109, next the calculator 150 calculates an evaluation value (rank evaluation value) when displaying the noteworthy character string as search results based on the similarity coefficient, for the combination determined in step S105 (step S110). In this preferred embodiment, the higher the rank evaluation value, the higher the evaluation as a search result and the more priority given in display.

The rank evaluation value (Estidxid, hdlid) is determined from the difference between the similarity coefficient found in step S109 and the lengths (character lengths) of the search character string and the target character string (noteworthy character string). In this preferred embodiment, the calculation is made using the following Equation (2).

[Equation 2]

$$ESt_{idxid,hdlid} = FuzzyEst_{idxid,hdlid} + EstDiffLength_{idxid,hdlid} + EstSpBigram_{idxid,hdlid} = \quad (2)$$

Here, EstDiffLengthidxid, hdlid is the evaluation value of the difference in lengths (character lengths) between the search character string and the target character string (noteworthy character string). EstDiffLengthidxid, hdlid may be found with an arbitrary method such that this value is at its largest when the difference in character lengths is 0 and becomes smaller the larger the difference becomes, but here this is found using the below Equation (3).

$$EstDiffLengthidxid, hdlid = \Delta l \times Dconst \quad (3)$$

Here, $\Delta l$ is a variable showing the difference in the lengths (character lengths) between the search character string and the target character string (noteworthy character string). Dconst is a prescribed constant (here, −1).

In addition, EstSpBigramidxid, hdlid is an evaluation value determined by whether or not the N-grams containing the delimiting characters appear in the target character string (noteworthy character string), out of the N-grams in the search character string. EstSpBigramidxid, hdlid can have a setting that either becomes larger when N-grams containing the delimiting characters appear in the target character string (noteworthy character string) or a setting that conversely becomes smaller (makes this a negative value). Here, the calculation was done using Equation (4) below.

$$EstSpBigramidxid, hdlid = EstTop \times TopConst + EstLast \times LastConst \quad (4)$$

Here, EstTop is a variable that becomes 1 when the lead N-gram of the search character string ("•s" in the example of FIG. 14) appears in the target character string and becomes 0 when this does not appear. EstLast is a variable that becomes 1 when the last N-gram in the search character string ("d•" in the example of FIG. 14) appears in the target character string and becomes 0 when this does not appear. TopConst and LastConst are preset weighted constants.

In this preferred embodiment, TopConst and LastConst are set to a negative numerical value (for example, both set to −5) so that a negative numerical value is obtained when N-grams containing the delimiting characters appear in the target character string (noteworthy character string). This is because in this preferred embodiment the initial and final characters ("s" and "d" in the example of FIG. 14) of the search keyword appear as both monograms and bigrams, so there are cases in which the effect imposed on the evaluation value becomes too strong and becomes a factor in search noise. Specifically, for example when "s" exists in the search keyword and at the start of the headline word in FIG. 14, two N-grams ("s" and "•s") agree in each, so the evaluation value increases greatly and in some cases the effect on the evaluation value when another character (for example, "e") does not agree becomes too small. In this case, there is a concern that the evaluation value will become inappropriately large for a headline word (for example, "ssd" and/or the like) in which the lead is "s" and the end is "d" but the other characters differ greatly. Hence, by setting TopConst and LastConst to negative numerical values, it is possible to ensure that the effect imposed by the end characters does not become too large.

On the other hand, there are also cases in which it is effective to set EstSpBigramidxid, hdlid large when the N-gram appears in the target character string (noteworthy character string). This is true, for example, when the end (first and last) characters matching between the search keyword and the headline word is strongly sought as a condition of search results (for example, when looking to greatly lower the display order of keywords whose first part does not match). The values of TopConst and LastConst can be freely changed through the user's setting operations.

The rank evaluation value is a numerical value comprehensively evaluating the degree of similarity between the search character string and the target character string (headline word), so it is also possible to express the degree of similarity between the search character string and the target character string. In this preferred embodiment, Fconst is set to 100 and Dconst is set to −1. As a result, a target character string having a large normalized cumulative match frequency will have a higher rank evaluation value than a target character string that is not this way (regardless of differences in length). In addition, for target character strings having the same normalized cumulative match frequency, rank evaluation values will be higher for target character strings having smaller differences in length.

When the rank evaluation value is calculated in step S110, next the calculator 150 determines whether or not there is an unprocessed combination from among the multiple combinations shown in FIG. 13 (step S111). When the result of this determination is that there is an unprocessed combination (step S111: Yes), the processes from step S105 are repeated for the next unprocessed combination. On the other hand, when all combinations have been processed (step S111: No), the largest ranked evaluation value out of the ranked evaluation values calculated in step S110 for all combinations determined in step S105 is determined to be the ranked evaluation value evaluating the degree of similarity between the noteworthy character string and the search character string (step S112)

When the process in step S112 concludes, the searcher 140 determines whether or not the processes have concluded for all headline words of the headline word number extracted in step S102 (step S113). When there is an unprocessed headline word (step S113: No), the processes are repeated from step S104 with the next headline word as the noteworthy character string.

On the other hand, when the determination is that all of the above-described processes are completed for all headline words (step S113: Yes), the ambiguous search process ends.

Returning to FIG. 9, when the ambiguous search process in step S14 concludes, the output device 170 outputs the search results and the search results are caused to be displayed on the display device 180 (step S15).

Specifically, the rank evaluation values calculated in step S110 of the ambiguous search process (FIG. 11) are displayed on the display device 180 in descending order of magnitude along with a prescribed number of headline words and the type of dictionary containing those headline words (FIG. 6). Or, all headline words with a rank evaluation values at least as great as a prescribed threshold value may be displayed.

As explained above, the text search device of this preferred embodiment executes an ambiguous search taking into consideration differences in character lengths of documents (headline words and/or the like) of search targets and search keywords, whether or not the ends (first character and last character) match. Consequently, it is possible to execute ambiguous searches with high accuracy.

In addition, all characters appearing in the search character string are included in one of the N-grams the extractor extracts, so it is possible to obtain ambiguous search results with high accuracy reflecting the search character string as a whole.

In addition, the number of N-grams common to the search character string and the target character string whose relative positions match is found, with the position in which the common N-grams respectively appear as a reference, and using this result the degree of similarity is calculated, and consequently, even when there are differences in the search character string and the target character string, it is possible to output ambiguous search results that reflect the extent to which the character strings as a whole are similar.

In addition, the text search device of this preferred embodiment is set so that the smaller the difference in character length between the search character string and the target character string, the higher the rank evaluation value (which corresponds to the degree of similarity between the search character string and the target character string). Consequently, results in which the lengths of the search character string and the target character string are close are displayed with priority. Stated conversely, headline words that differ greatly from the character length input by the user have a lower display priority (or are not displayed), so it is possible to reduce search noise.

Furthermore, because the ambiguous search is executed using a transposition index like the one shown in FIG. 8, it is possible to execute ambiguous searches with high speed. This transposition index can be used in search processes other than ambiguous searches. Consequently, when realizing multiple search functions containing ambiguous searches, less memory capacity need be used.

A transposition index like that shown in FIG. 8 includes information (G file) specifying documents belonging to each group after character strings (headline words) that are search targets have been grouped for each character length. The text search device of this preferred embodiment is composed so that when doing ambiguous searches, the G file is referenced and documents with character lengths differing greatly from the search keyword do not become targets of the ambiguous search (are omitted from the search process), and through this it is possible to execute ambiguous searches at high speed.

In addition, as search patterns that become process targets, bigrams are extracted for N-grams at ends containing delimiting characters and monograms for N-grams not containing such (corresponding to character strings of search keywords). With this kind of composition, it is possible to prevent the degree of similarity from falling too far by a single mismatch having an effect on multiple N-grams, while maintaining the positional relationship between the delimiting characters and the search keywords.

In addition, when any of the N-grams included in the search pattern appear in multiple locations in the noteworthy character string, the ranked evaluation value is calculated for each of the combinations of appearance positions of the multiple locations as shown in FIG. 13, and the maximum ranked evaluation value becomes the evaluation value of the noteworthy character string. When comparing, for an N-gram appearing in multiple locations in the noteworthy character string, the matching frequency with which that N-gram is found as a noteworthy N-gram, there are cases when it is impossible to estimate what is the desired position where a ranked evaluation value with a higher accuracy than any other position can be obtained. With this kind of composition, even when any N-gram appears in multiple locations in the noteworthy character string, it is possible to execute ambiguous searches with high accuracy.

(Variation)

Above, the first preferred embodiment of the present invention was described but the embodiments of the present invention are not limited to this.

For example, in the above-described first preferred embodiment, the delimiting character is a half-width space, but the delimiting character is not limited to this and can be freely selected. For example, the delimiting character may be a unique mark (a mark that does not appear in text that is the target of ambiguous searches otherwise) reserved in the system.

Furthermore, in the first preferred embodiment and this variation, in the noteworthy character string in step S107, the frequency with which common N-grams appear with the same positional relationship as the search character string is counted. However, it would be fine to count the frequency with which similar positional relationships are expressed, not being limited to the same positional relationship. In this case, for example even when the position in the search character string and the absolute value of the relative position are shifted within a range of a prescribed number of characters (for example, one character) as a similarity range, a matching histogram is added similar to the case of appearing at a common position. Or, when adding to the matching histogram, it would be fine to set a calculation method such that the matching frequency is higher the more similar the position in which this appears, such as weighted addition using a weighting of 1 when the appearance position matches the search character string and a weighting of 0.5 when shifted by one character.

In this case, even when the positions where the N-grams appear do not match perfectly in the search character string and the target character string, the ranked evaluation value increases based on the fact that this is contained within a prescribed similarity range, so even if there are numerous input errors, the result is obtained that the percentage of producing search results desired by the user increases.

In addition, in the first preferred embodiment, the text search device 100 executes a process (data generation process) that generates a rearranged CTD and transposition index, but this is intended to be illustrative and not limiting, for a rearranged CTD and transposition index generated by an external device in advance may be stored in memory. For example, when shipping to a factory, it would be fine to store in memory a rearranged CTD and transposition index corresponding to each dictionary data item.

The target character string that is the search target is not limited to headline words but may use explanatory text or example text.

In the first preferred embodiment and the variation thereof, the text search device 100 was explained as searching dictionaries based on search keywords, but the documents that are targets of searchers are not limited to dictionaries and may be any kind of document.

Documents that are targets of searches may be patent specifications comprising text classified respectively into categories such as "Title of the Invention" and "Scope of Claims", for example. In addition, the documents that are targets of searches may be for example specifications having categories (hereafter called function name categories) in which text indicating names of functions a given product possesses is classified, and categories (hereafter called operation method categories) in which text indicating operation methods for using those functions is classified.

The present invention can provide the text search device 100 according to the first preferred embodiment or the variation thereof, and an existing text search device can also function as the text search device 100 through application of a program. That is to say, by having a computer (CPU and/or the like) that controls an existing text search device execute a text search program for realizing the various functions comprising the text search device 100, it is possible to cause the existing text search device to function as the text search device 100 according to the first preferred embodiment or the variation.

The distribution method for this kind of program is arbitrary. For example, the program can be stored and distributed on a recording medium such as a memory card, CD-ROM (Compact Disc Read Only Memory) or DVD-ROM (Digital Versatile Disk Read Only Memory) and/or the like, or can be distributed via a communications medium such as the Internet. In addition, all or part of the data necessary for the above-described processes such as rearranged CTD, transposition index and/or the like can be stored on an external server, and the composition can be such that this data is acquired through a communications function and the above-described processes executed.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A search device comprising:
a memory device including a memory area which stores document data containing search target character strings to which delimiting characters are appended at both ends;
an acquirer which acquires a keyword;
a generator which generates a search character string by appending delimiting characters to both ends of the keyword acquired by the acquirer;
a designator which extracts multiple N-gram strings from the search character string generated by the generator and executes a designation process to designate appearance positions where those extracted N-gram strings appear in one of the search target character strings of the document data;
a selector for selecting an N-gram contained in the search target character string one at a time;
a counter for counting a number of N-grams whose relative positions match when the search target character string and the search character string are compared, based on a position where the selected single N-gram appears, for each single N-gram selected by the selector;
an evaluator which evaluates a degree of similarity between the search target character string and the search character string based on a frequency of a count value counted by the counter and a difference in character lengths of the search target character string and the search character string; and
an output device which outputs the search target character string based on evaluation results of the evaluator.

2. The search device according to claim 1, wherein:
the designator includes an extractor which extracts multiple N-gram strings so that each N-gram contained in the search character string is included in one of the N-gram strings; and
the designator executes the designation process for the N-gram strings extracted by the extractor.

3. The search device according to claim 2, wherein of the N-gram strings extracted by the extractor, the N-gram strings containing the delimiting characters each include two or more characters.

4. The search device according to claim 3, wherein the memory device further comprises a memory area which stores an index showing the position where each of the N-gram strings contained in multiple search target character strings and containing a prescribed number of characters appears in the search target character string;
wherein the designator designates the position where the N-gram strings appear using the index.

5. The search device according to claim 4, wherein:
the index, after the multiple search target character strings are grouped based on character length, contains information compiling references to the search target character string for each group; and
the designator executes the designation process for the search target character strings contained in groups in which the difference between the character length of the group and the character length of the search character string is smaller than a prescribed threshold value, and omits the designation process for search target character strings contained in groups in which the difference is larger than the prescribed threshold value.

6. The search device according to claim 3, wherein of the N-gram strings extracted by the extractor, the N-gram strings not containing the delimiting characters are each composed of one character.

7. The search device according to claim 1, wherein the evaluator uses the count value (g) counted by the counter, the frequency (F) thereof, and a number (M) of N-grams in the search character string to obtain a similarity coefficient FE as follows:

$$FE=[\Sigma(g \times f)/M \times M] \times \text{const}$$

and evaluates the degree of similarity based on the similarity coefficient and the difference in the character lengths of the search target character string and the search character string.

8. A method for searching desired search target character strings from document data containing search target character strings to which delimiting characters have been appended at both ends, the method comprising:
acquiring a keyword;
generating a search character string by appending delimiting characters to both ends of the acquired keyword;
extracting multiple N-gram strings from the generated search character string and executing a designation process to designate appearance positions where those extracted N-gram strings appear in one of the search target character strings of the document data;

selecting an N-gram contained in the search target character string one at a time;

counting a number of N-grams whose relative positions match when the search target character string and the search character string are compared, based on a position where the selected single N-gram appears, for each single N-gram selected in the selecting;

evaluating a degree of similarity between the search target character string and the search character string based on a frequency of a count value of N-grams whose relative positions match and a difference in character lengths of the search target character string and the search character string; and, outputting the search target character string based on evaluation results of the evaluating.

9. The search method according to claim 8, wherein:
said designating the appearance position includes extracting multiple N-gram strings so that each N-gram contained in the search character string is included in one of the N-gram strings; and
the designation process is executed for the extracted N-gram strings.

10. The search method according to claim 9, wherein of the extracted N-gram strings, the N-gram strings containing the delimiting characters each include two or more characters.

11. The search method according to claim 10, wherein the document data is stored in a memory area of a memory, and the memory further includes a memory area which stores an index showing the position where each of the N-gram strings contained in multiple search target character strings and containing a prescribed number of characters appears in the search target character string;
wherein said designating the appearance positions comprises designating the positions where the N-gram strings appear using the index.

12. The search method according to claim 11, wherein:
the index, after the multiple search target character strings are grouped based on character length, contains information compiling references to the search target character string for each group; and
the designation process is executed for the search target character strings contained in groups in which the difference between the character length of the group and the character length of the search character string is smaller than a prescribed threshold value, and omits the designation process for search target character strings contained in groups in which the difference is larger than the prescribed threshold value.

13. The search method according to claim 10, wherein of the extracted N-gram strings, the N-gram strings not containing the delimiting characters are each composed of one character.

14. The method for searching according to claim 8, wherein said evaluating the degree of similarity between the search target character strings and the search character string comprises using the count value (g) of N-grams whose relative positions match, the frequency (F) thereof, and a number (M) of N-grams in the search character string to obtain a similarity coefficient FE as follows:

$$FE = [\Sigma(g \times f)/M \times M] \times \text{const}$$

and evaluating the degree of similarity based on the similarity coefficient and the difference in the character lengths of the search target character string and the search character string.

15. A non-transitory recording medium on which is recorded a program for causing a computer to function as:
a memory device for storing document data containing search target character strings to which delimiting characters are appended at both ends;
an acquirer for acquiring a keyword;
a generator for generating a search character string by appending delimiting characters to both ends of the keyword acquired by the acquirer;
a designator for extracting multiple N-gram strings from the search character string generated by the generator and executing a designation process to designate appearance positions where those extracted N-gram strings appear in one of the search target character strings of the document data;
a selector for selecting an N-gram contained in the search target character string one at a time;
a counter for counting a number of N-grams whose relative positions match when the search target character string and the search character string are compared, based on a position where the selected single N-gram appears, for each single N-gram selected by the selector;
an evaluator for evaluating a degree of similarity between the search target character string and the search character string based on a frequency of a count value counted by the counter and a difference in character lengths of the search target character string and the search character string; and,
an output device for outputting the search target character string based on evaluation results of the evaluator.

16. The non-transitory recording medium according to claim 15, wherein:
the designator includes an extractor for extracting multiple N-gram strings so that each N-gram contained in the search character string is included in one of the N-gram strings; and
the designator executes the designation process for the N-gram strings extracted by the extractor.

17. The non-transitory recording medium according to claim 16, wherein of the N-gram strings extracted by the extractor, the N-gram strings containing the delimiting characters each include two or more characters.

18. The non-transitory recording medium according to claim 17, wherein the memory device includes a memory area for storing an index showing the position where each of the N-gram strings contained in multiple search target character strings and containing a prescribed number of characters appears in the search target character string;
wherein the designator designates the position where the N-gram strings appear using the index.

19. The non-transitory recording medium according to claim 18, wherein:
the index, after the multiple search target character strings are grouped based on character length, contains information compiling references to the search target character string for each group; and
the designator executes the designation process for the search target character strings contained in groups in which the difference between the character length of the group and the character length of the search character string is smaller than a prescribed threshold value, and omits the designation process for search target character strings contained in groups in which the difference is larger than the prescribed threshold value.

20. The non-transitory recording medium according to claim 17, wherein of the N-gram strings extracted by the extractor, the N-gram strings not containing the delimiting characters are each composed of one character.

21. The recording medium according to claim 15, wherein the evaluator uses the count value (g) counted by the counter, the frequency (F) thereof, and a number (M) of the N-grams in the search character string to obtain a similarity coefficient FE as follows:

$$FE = [\Sigma(g \times f)/M \times M] \times \text{const}$$

and evaluates the degree of similarity based on the similarity coefficient and the difference in the character lengths of the search target character string and the search character string.

\* \* \* \* \*